United States Patent [19]
Hoffman, Sr.

[11] Patent Number: 5,205,264
[45] Date of Patent: Apr. 27, 1993

[54] FUEL VAPORIZER AND SYSTEM FOR AN INTERNAL COMBUSTION ENGINE

[76] Inventor: Larry L. Hoffman, Sr., 2521 Victory Palm Dr., Edgewater, Fla. 32141

[21] Appl. No.: 758,205

[22] Filed: Sep. 12, 1991

Related U.S. Application Data

[63] Continuation of Ser. No. 614,243, Nov. 16, 1990, abandoned.

[51] Int. Cl.⁵ ............................................... F02G 5/00
[52] U.S. Cl. ..................... 123/555; 123/531; 123/568; 239/405
[58] Field of Search ............... 123/531, 532, 533, 539, 123/540, 552, 555, 557, 545, 547, 543, 554, 568; 239/405, 270

[56] References Cited

U.S. PATENT DOCUMENTS

| | | | |
|---|---|---|---|
| 2,012,525 | 8/1935 | Turner | 123/557 |
| 3,667,436 | 6/1972 | Reichhelm | 123/555 |
| 3,782,639 | 1/1974 | Boltz et al. | 123/472 |
| 3,890,945 | 6/1975 | Goto et al. | 123/546 |
| 4,006,719 | 2/1977 | Kanda et al. | 239/405 |
| 4,040,403 | 8/1977 | Rose et al. | 123/568 |
| 4,148,285 | 4/1979 | Ahlers | 123/590 |
| 4,656,987 | 4/1987 | Arpaia | 123/568 |
| 4,817,570 | 4/1989 | Morita et al. | 123/472 |
| 5,035,358 | 7/1991 | Katsuno et al. | 239/405 |

Primary Examiner—Noah P. Kamen
Attorney, Agent, or Firm—Dennis H. Lambert

[57] ABSTRACT

The present invention is directed to a fuel vaporizer and system. The fuel vaporizer comprises a fuel injector and a pair of facing nozzle sections for mixing the fuel/air mixture. Further, the internal configuration of the vaporizer and the directing of the incoming air stream into the vaporizer creates a vortex flow within the fuel vaporizer in combination with preheating and pressuring the fuel to facilitate a high degree of mixing within the vaporizer. The vaporizer and system can be added to an existing carbureted or fuel injected system of an internal combustion engine.

23 Claims, 8 Drawing Sheets

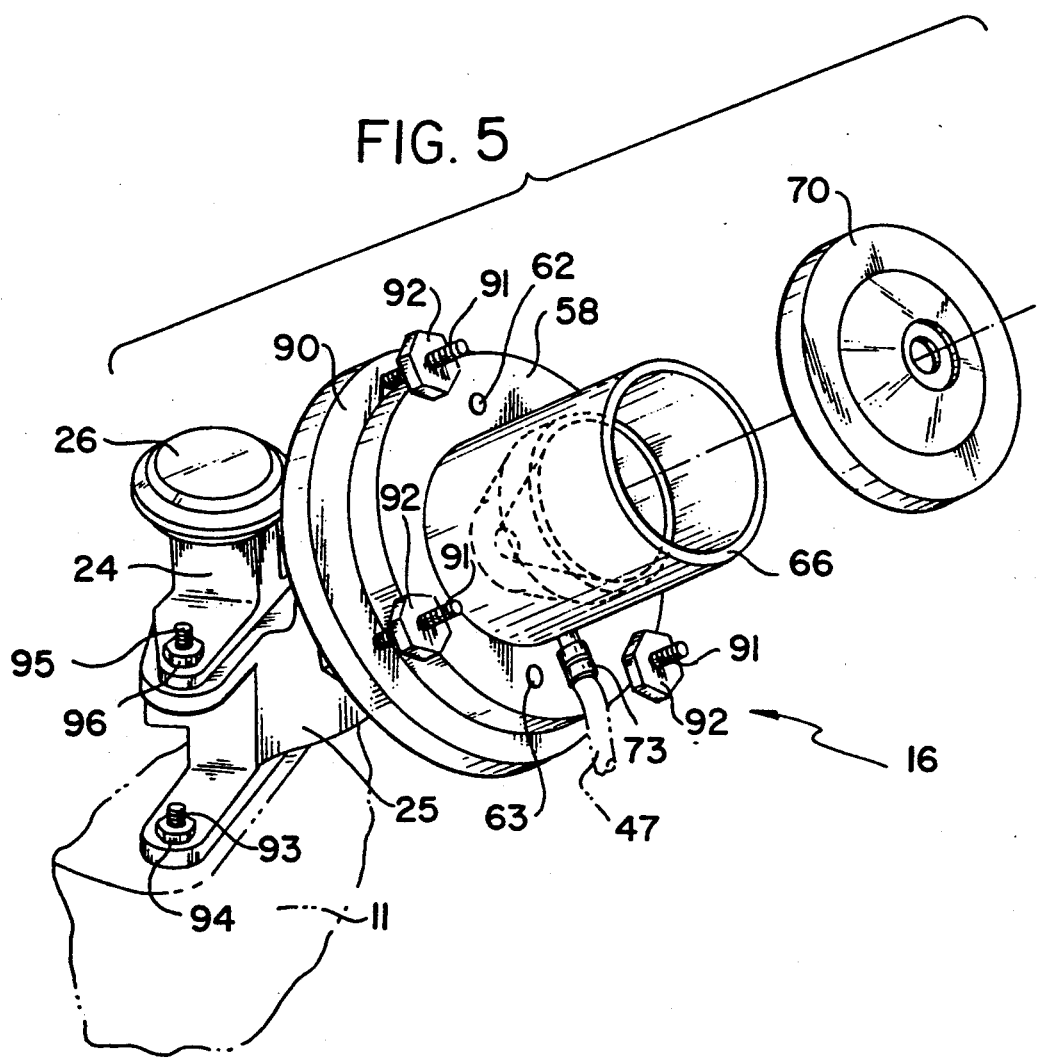

FUEL VAPORIZER AND SYSTEM FOR AN INTERNAL COMBUSTION ENGINE

This is a continuation of copending application Ser. No. 07/614,243 filed on Nov. 16, 1990, now abandoned.

BACKGROUND OF THE INVENTION

1. Field of the Invention:

This invention relates to a fuel vaporizer device and system for vaporizing fuel supplied to an internal combustion engine to substantially increase the fuel efficiency of the engine. More particularly, the invention relates to such a device and system that can be incorporated with either a carbureted or fuel injected system of an internal combustion engine. The device has a particular arrangement for vaporizing and mixing pre-heated fuel with a heated stream of air by utilizing vortex flow within the device. Further, the device and system of the present invention are especially suitable for incorporation with an existing exhaust gas recirculation system, carburetor, induction fuel injection system, or a multi-port fuel injection system of an internal combustion engine.

2. Prior Art:

The concept of fuel vaporization prior to induction into the cylinders of an internal combustion engine is well known. Further, there is a general understanding that the greater the degree of vaporization of the fuel prior to induction, the better the fuel efficiency and output of the engine.

In the past, many attempts have been made to utilize the waste heat of the internal combustion engine to pre-heat the fuel prior to induction to aid in its vaporization for the above purposes. Such attempts have included the use of fuel vaporizers, constructed either as original equipment or as retro-fit items. These prior art devices generally require a substantial modification to an existing engine and its accessories. Moreover, such prior art systems are typically used with carbureted engines.

Prior art fuel vaporizers are also typically specially designed for a particular engine and application and make up an integrated fuel delivery system.

In contrast, the fuel vaporizer of the present invention can be fitted into a variety of different fuel supply systems, including fuel injection systems as well as carbureted systems, making its application quite versatile. The system of the present invention includes components especially adapted for attachment to the existing exhaust gas recirculation (E.G.R.) valve of the engine without requiring substantial modification of any of the engine components.

SUMMARY OF THE INVENTION

Accordingly, it is a primary object of this invention to provide a fuel vaporizing device and system for substantially completely vaporizing the fuel supplied to the engine, whereby more complete combustion of the fuel takes place, with consequent increased efficiency and reduced pollutants.

Another object of the present invention is to provide an improved fuel vaporizing device and system for an internal combustion engine.

A further object of the present invention is to provide a combined fuel vaporizing and fuel injecting device and system for an internal combustion engine.

An even further object of the present invention is to provide a fuel injection device and system which can be incorporated into an existing fuel injection device and system.

A still further object of the present invention is to provide a fuel vaporizing device and system for an internal combustion engine which utilize both heating and fluid dynamic mixing principles for increasing the extent and degree of vaporization of fuel within a fuel/air mixture.

Yet another object of the present invention is to provide a fuel vaporizing device and system for an internal combustion engine which utilize waste heat of the engine in combination with vortex flow mixing to increase the extent of vaporization of fuel into the air/fuel mixture.

A still further object of the present invention is to provide a fuel vaporizing system for an internal combustion engine comprising a combined fuel vaporizing and injecting device for attachment to an existing exhaust ga recirculation circuit.

These and other objects of the invention are accomplished by the installation of the vaporizing device and system according to the present invention on an internal combustion engine.

The present invention attempts to provide substantial heating of the fuel within the fuel vaporizing device in combination with fluid dynamic mixing processes to provide a high level of fuel vaporization prior to induction. More specifically, the device of the present invention utilizes an internal annular structure to produce turbulence and vortex flow at a mixing region within the device. Further, the fuel is preheated and pressurized prior to entering the vaporizing device. Upon entering the device, the pressure is reduced below ambient pressure (i.e. a vacuum) greatly increasing the extent of vaporization of the pre-heated fuel, and reducing the level of temperature required to vaporize the fuel.

In one embodiment, the fuel vaporizing device and system of the present invention can be incorporated into an existing internal combustion engine induction fuel injection system. This can be accomplished by providing a suitable embodiment of the fuel vaporizer of the present invention which can be connected with or into an existing or original equipment induction fuel injection device system, and particularly as a bolt-on device to the existing E.G.R. valve. Such a bolt on device could be made available as an after market product and fitted on a new or used vehicle in a relatively simple and inexpensive manner.

The fuel vaporizer of the present invention is provided with a vaporizer tube for directing a stream of pre-heated air in a circumferential direction within an annular space along the inner surface of an annular body of the device. The annular space is defined between an internal nozzle section and the inner surface of the annular body proper. The annular space extends into a mixing region within the device. The mixing region is defined between the nozzle section of the fuel injecting component and the internal nozzle section of the fuel vaporizing component.

The fuel vaporizing device according to the present invention can be installed in combination with an existing fuel injection system of an internal combustion engine, or it can be used in combination with a carbureted system. Further, the vaporizer of the invention may be assembled with an existing E.G.R. valve. More specifically, the vaporizer of the present invention can be added to an existing internal combustion engine having an E.G.R. circuit. For example, the fuel vaporizer can be added to an induction fuel injected engine having a single port throttle body with a primary fuel injector and an auxiliary fuel injector. The existing engine outfitted with a fuel injection computer can be reprogrammed to begin the start up operation by operating the primary and auxiliary fuel injectors, and after the engine has reached operating temperature, the primary injector can be switched off and the fuel vaporizer connected into the existing E.G.R. system can be operated in substitution of the primary fuel injector.

Alternatively, the vaporizer of the invention may be assembled together with the throttle body of an existing fuel injection system or with an existing carburetor. More specifically, the existing throttle body can be modified by replacing the primary fuel injector or venturi, respectively, with the fuel vaporizer according to the present invention.

In addition, the fuel vaporizer of the present invention can be installed at a remote location with a flow passageway, for example provided by a section of tubing, extending from the fuel vaporizer to the intake manifold, and separate from the existing E.G.R. system.

Further, these and other objects of the invention are accomplished by the installation of the fuel vaporizer system of the present invention on an internal combustion engine. The system can include an air filter with a high heat tube and low heat tube extending therefrom. The high heat tube is provided with a solenoid valve and a section thereof extends through an exhaust manifold of the device for heating the air stream contained therein. The low heat tube includes a section coiled about an exhaust pipe or exhaust manifold of the engine.

The high heat tube and the low heat tube are connected to a heat absorption unit having a thermocouple. The thermocouple provides a signal to a temperature control unit, which in turn produces a signal for controlling the solenoid valve of the high heat tube. The air stream from the high heat tube and the low heat tube are mixed within the heat absorption unit to form a mixed air stream having a particular temperature. The temperature control unit sends a signal to the solenoid valve of the high heat tube to adjust the extent of opening of this valve to control the amount of high temperature air passing through the high temperature tube that reaches the heat absorption unit. By controlling the amount of heated air from the high heat tube reaching the heat absorption unit and mixing with the air stream from the low heat tube, the temperature of the mixed stream of air exiting the heat absorption level can be controlled and adjusted as desired.

The heated mixed air stream from the heat absorption unit is transferred to a vaporizer by means of a vaporizer tube. This system can utilize the above-described vaporizer according to the present invention and possibly other vaporizing devices.

Alternatively, other components or systems can be provided to supply heated air to the fuel vaporizer according to the present invention. For example, the heated gased from an emmission gas recirculation circuit can be used as a source of heated air for the fuel vaporizer.

BRIEF DESCRIPTION OF THE DRAWINGS

Referring to the drawings, wherein like references characters refer to like parts throughout the several views, and wherein:

FIG. 5 is a partial break-away perspective view of the fuel vaporizing device according to the present invention connected to an existing E.G.R. valve with an adapter;

DETAILED DESCRIPTION OF THE PREFERRED EMBODIMENTS

Figure 1:
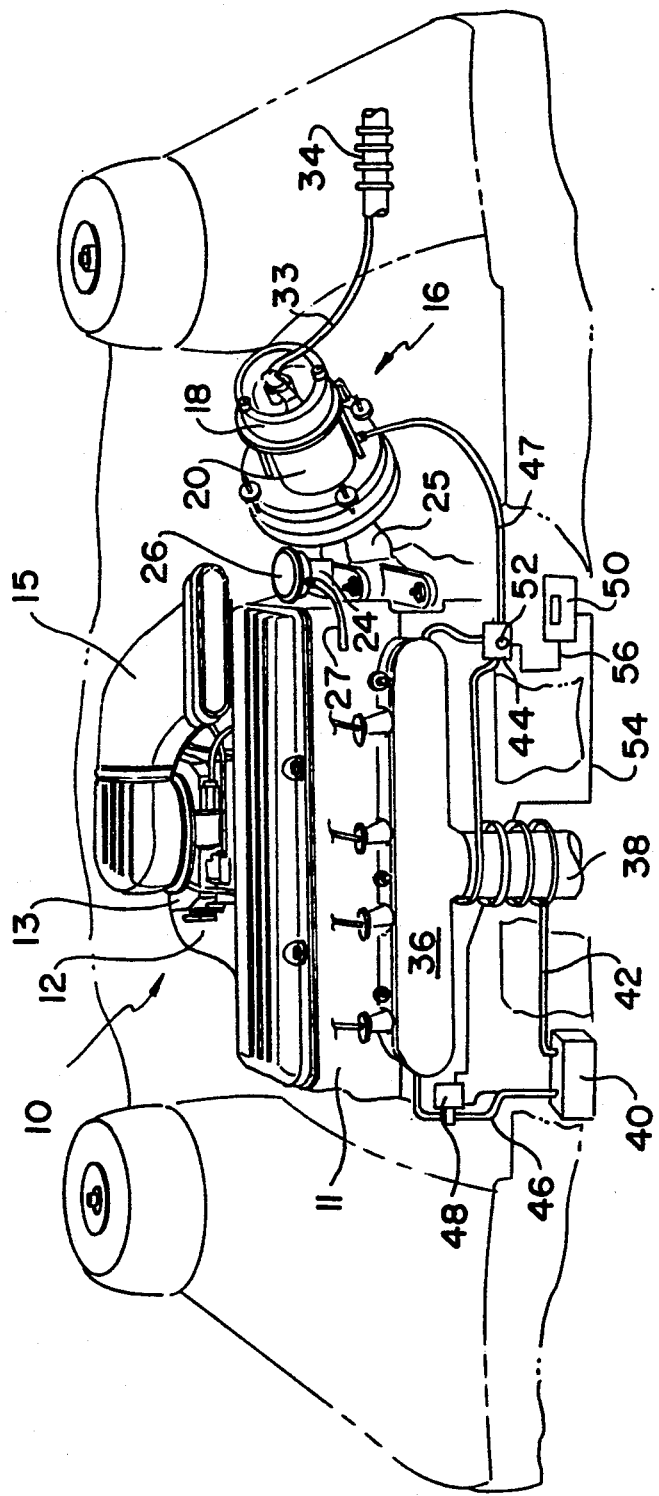
FIG. 1 is a perspective view of an installed transverse mounted automobile engine with the fuel vaporizer and system according to the present invention installed thereon.
Figure 2:
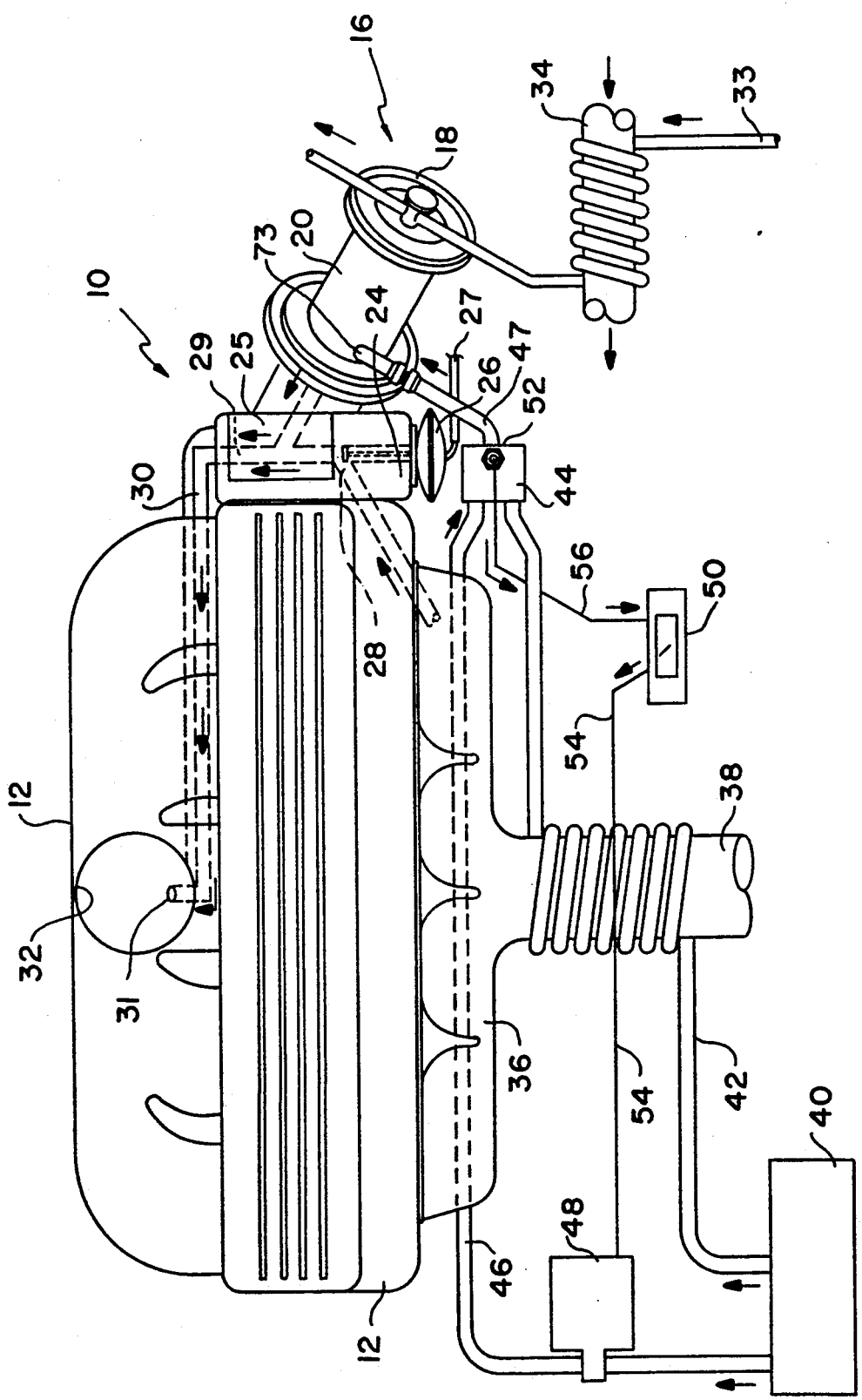
FIG. 2 is a top diagrammatic view of the engine illustrated in FIG. 1, with portions removed for purposes of clarity.

A perspective view of an internal combustion engine 10 is shown in FIG. 1 and a top diagrammatic view is shown in FIG. 2. The internal combustion engine 10 includes a cylinder head 11 provided with an intake manifold 12 having a throttle body 13. An air filter (not shown) is connected to the air inlet duct 15, which directs an air stream into the intake of the throttle body 13.

A fuel vaporizing device 16 according to the present invention is mounted on the engine 10. The fuel vaporizing device 16 includes a fuel injection component 18 connected with a fuel vaporization component 20. The fuel injection component may comprise a venturi instead of a fuel injection device, if desired, although the fuel injection device is preferred. The fuel vaporizing device 16 is connected to an Exhaust Gas Recirculation (E.G.R.) valve 24 by an extension or adapter 25. A vacuum actuator 26 connected to vacuum line 27 controls the operation of the E.G.R. valve 24. A flow passage 28 through the E.G.R. valve 24 aligns with a flow passage 29 through the adapter 25 (See FIG. 2).

An E.G.R. tube 30 extends from the E.G.R. valve 24 to the E.G.R. exit port 31 located at the entrance of the air injection port 32 (See FIG. 2).

A fuel line 33 extending from a fuel tank (not shown) is connected to the fuel injecting component 18. The fuel line 33 is coiled around a fuel pre-heater assembly 34, which is connected into a fluid heating/cooling system of for example a radiator of the internal combustion engine.

The opposite side of the cylinder head 11 relative to the intake manifold 12 is provided with an exhaust manifold 36. The exhaust manifold 36 is connected to the exhaust pipe 38.

An air filter 40 is provided as a component of the fuel delivery system. A low heat tube 42 extends from the air filter 40 to a heat absorption unit 44. A section of the low heat tube 42 is coiled around the exhaust pipe 38. A high heat tube 46 extends from the air filter 40 through the interior of the exhaust manifold 36 to the heat absorption unit 44. Alternatively, either or both of the high heat tube 46 and the low heat tube 42 can be relocated or coiled about various other components or combination of components of the internal combustion engine. For example, the tubes can be coiled or passed through a conventional catalytic converter or a special catalytic converter can be constructed for this purpose. The heat absorption unit 44 is connected to the fuel vaporizing device 16 by vaporizer tube 47.

A solenoid flow control valve 48 is connected into a section of the high heat tube 46. Further, a temperature control unit 50 is electrically connected to both the flow control solenoid valve 48 and a thermocouple 52 of the heat absorption unit 44 by signal wires 54 and 56, respectively. Alternatively, the the solenoid flow control unit 48 and the temperature control unit 50 can be replaced with other means for providing a flow temperature controlled feedback system for providing a supply of air at a particular temperature to the fuel vaporizing device 16.

The above components including the air filter 40, low heat tube 42, high heat tube 46, heat absorption unit 44, solenoid flow control valve 48 and temperature control unit 48 provide a system for supplying heated air at a selected temperature to the fuel vaporizing device 16. This particular preferred arrangement focuses on the use of waste heat energy from the engine to provide the function of providing the fuel vaporizing device 16 with heated air. However, the preferred arrangement can be replaced with a number of alternative means for supplying heated air to the fuel vaporizing device 16. For example, an electrical resistance heater can be used for heating air passing through a conduit leading to the fuel vaporizing device 16, or the heated gases from an emmission gas recirculation circuit can be used as a source of heated air for the fuel vaporizing device 16.

Figure 3:
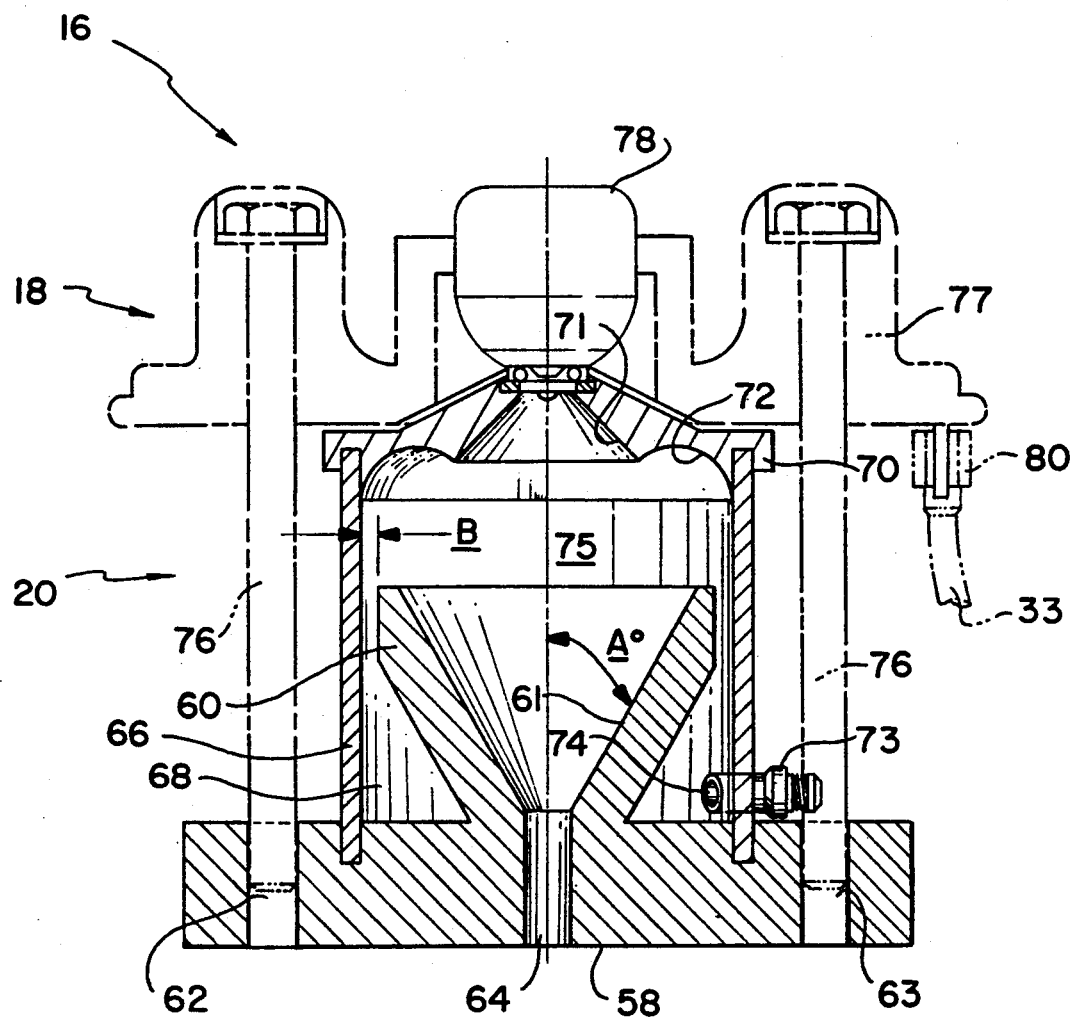
FIG. 3 is a detailed cross-sectional view of the fuel vaporizing device according to the present invention.

A detailed cross-sectional view of the fuel vaporizing device 16 according to the present invention is shown in FIG. 3. The device 16 comprises a base plate 58 having a nozzle section 60 extending from one side thereof. The nozzle is configured as a convergent nozzle having an inner conical surface 61 set at an angle relative to the average flow direction through the nozzle section 60. The base plate 58 can be round in shape and provided with a pair of bolt holes 62 and 63. However, other suitable shapes and component connecting arrangements can be substituted for that shown in the drawings. A fluid passage 64 extends through the base plate 58 into the interior of the nozzle section 60.

Positioned around the nozzle section 60 and connected to the base plate 58 is an annular body 66. Located between the inner surface of the annular body 66 and the exterior surface of the nozzle section 60 is an annular flow path 68 of decreasing cross-sectional area in the direction of fluid flow. An annular space of thickness B is defined at the closest distance betwee the nozzle section 60 and the inner surface of the annular body 66.

Positioned at an opposite end of the annular body 66 is an annular end cap 70. The inner surface of the annular end cap 70 defines a nozzle section 71 extending to an annular concave surface section 72.

A tube connector 73 extends through the wall of the annular body to the air injector 74. The air injector 74 is configured to direct an air stream exiting therefrom in a circumferential direction within annular body 66, specifically in the annular flow path 68 defined between the nozzle section 60 and the inner surface wall of the annular body 66. The annular space 68 extends into a mixing region 75 defined between the nozzle section 60 and the nozzle section 72.

In the embodiment shown, a flow passageway through the nozzle section 71 is aligned with the flow passageway through the nozzle section 60. Further, the nozzle section 71 is a reduced size mirror image of the nozzle section 60 (i.e. angle A is the same for both nozzles).

The fuel vaporizing device 16 is connected to the fuel injection component 18. In the assembly shown, bolts 76 connect the housing 77 of the fuel injecting component 18 to the base plate 58. The housing 77 of the fuel injecting component 18 accommodates a fuel injector 78, which is connected to a source of fuel through internal passages (not shown) in the housing 77. A fuel line connector 80 attached to the housing 77 is connected to fuel line 33. The fuel injector 78 is electrically connected to a control system through a set of wires (not shown) connected to terminals of the fuel injector 78.

The above described components and system can be used to modify an existing fuel supply system, or can be installed as original equipment. Further, the above description relates to providing a fuel vaporizing device according to the present invention into an Emission Gas Recirculation (E.G.R.) circuit of an induction fuel injection system to provide a fuel supply system according to the present invention. However, the fuel vaporizing device and/or system according to the present invention can be provided in alternative installations or systems. For example, the fuel vaporizing device and system of the present invention can be adapted for use with the Emmission Gas Recirculation system of a carborated internal combustion engine. Further, the fuel vaporizing device according to the present invention can replace conventional fuel injectors of an induction or, alternatively, a multiport fuel injection sytem as described below.

Figure 4A:
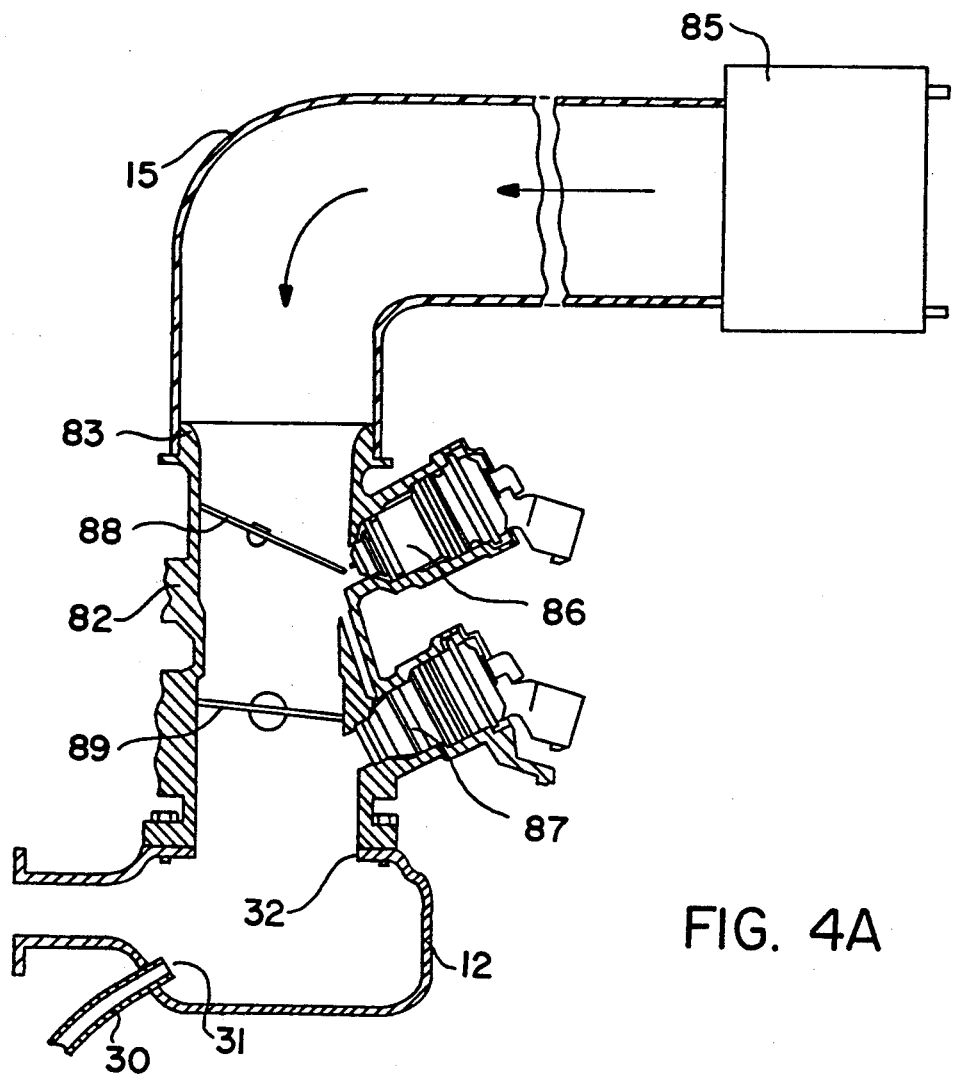
FIG. 4A is a detailed cross-sectional view of a throttle body having primary and auxiliary fuel injectors.

FIG. 4A shows a cross-sectional view of a throttle body 82 for use with the vaporizing device of the invention. The air intake 83 of the throttle body 82 is connected at its air intake 83 to air filter 85 by air intake duct 15. The throttle body 82 is mounted on th ⒷIntake manifold 12 at the entrance of the air injector port 34. Further, the E.G.R. exit port 31 is located inside the intake manifold 12 and in the vicinity of the exit end of the throttle body 82.

The throttle body 82 is fitted with a primary fuel injector 86 and an auxiliary fuel injector 87. These fuel injectors are connected to a supply of fuel and are electronically controlled and operated in combination with the fuel injector 78 of the vaporizing device 16, for example by a fuel injection computer for supplying fuel to the engine in a programmed manner. Further, the throttle body 82 is provided with butterfly valves 88 and 89 utilized to control air flow through the throttle valve 82.

Figure 4B:
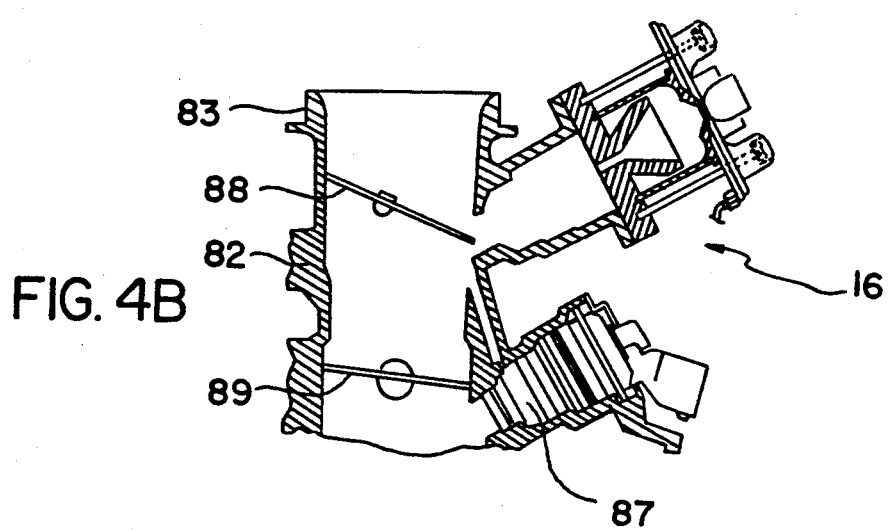
FIG. 4B is a detailed cross-section view of a modified throttle body having the primary fuel injector substituted with the fuel vaporizer according to the present invention.

In FIG. 4B, a modified version of the throttle body 82 is shown with the primary fuel injector replaced by a vaporizing device 16. The structure of the throttle valve 82 may or may not need to be modified to accept the fuel vaporizing device 16. Alternatively, or in combination, the auxiliary fuel injector can be replaced with a similar fuel vaporizing device. Accordingly, the vaporizing device 16 is connected into the existing fuel injection system and operated by the existing computer.

Figure 4C:
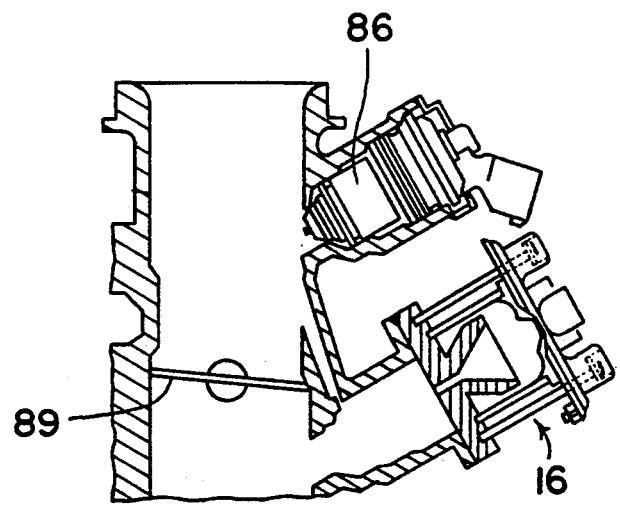
FIG. 4C is a detailed cross-sectional view of another modified throttle body having an auxially fuel injector substituted with the fuel vaporizer according to the present invention.

In FIG. 4C, the auxiliary fuel injector has been replaced with the fuel vaporizing device 16 according to the present invention in combination with the butterfly valve 88 being removed.

Figure 4D:
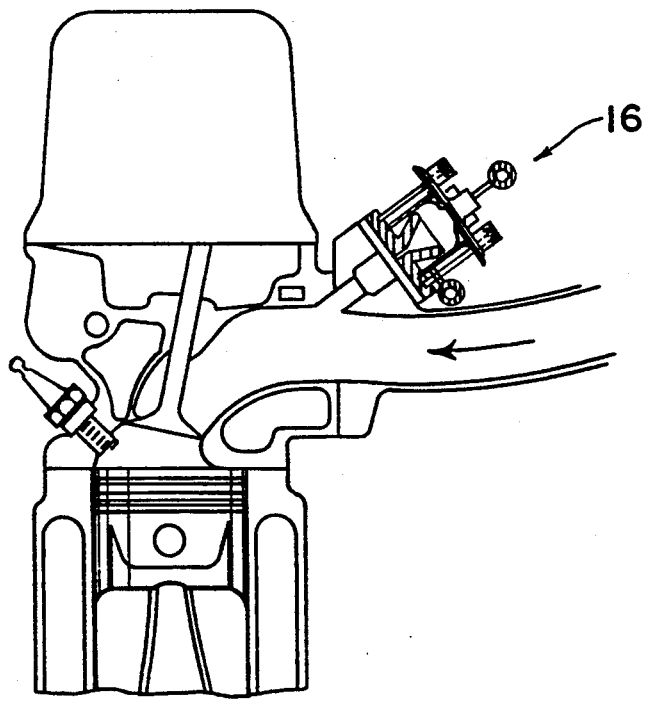
FIG. 4D is a detailed cross-sectional view of the fuel vaporizer according to the present invention replacing a fuel injector on a multiport fuel injected engine.

In FIG. 4D, the conventional fuel injectors of a multiport fuel injection system have been replaced with fuel vaporizing devices 16 according to the present invention.

A perspective view of the fuel vaporizing device 16 partially disassembled is shown installed with the existing E.G.R. valve 24 of the internal combustion engine, as shown in FIG. 5.

In this version, prior to installation of the vaporizing device 16 on the engine, the E.G.R. valve 24 sits directly on the cylinder head 11. In the retro-fit version, the adapter 25 bolts to the original E.G.R. valve 24 seat and bolts-up with both the existing E.G.R. valve 24 and the newly added fuel vaporizing device 16. Thus, the adapter 25 provides a new connection for the E.G.R. valve 25 with the cylinder head 11. More specifically, the E.G.R. valve 24 is bolted originally with the studs 93 of the cylinder head 11. In the retro-fit version, the adapter 25 is bolted to the cylinder head 11 by studs 93 and nuts 94 and the E.G.R. valve 24 is bolted to the adapter 25 by studs 95 and nuts 96.

FUEL VAPORIZING SYSTEM

Figure 6:
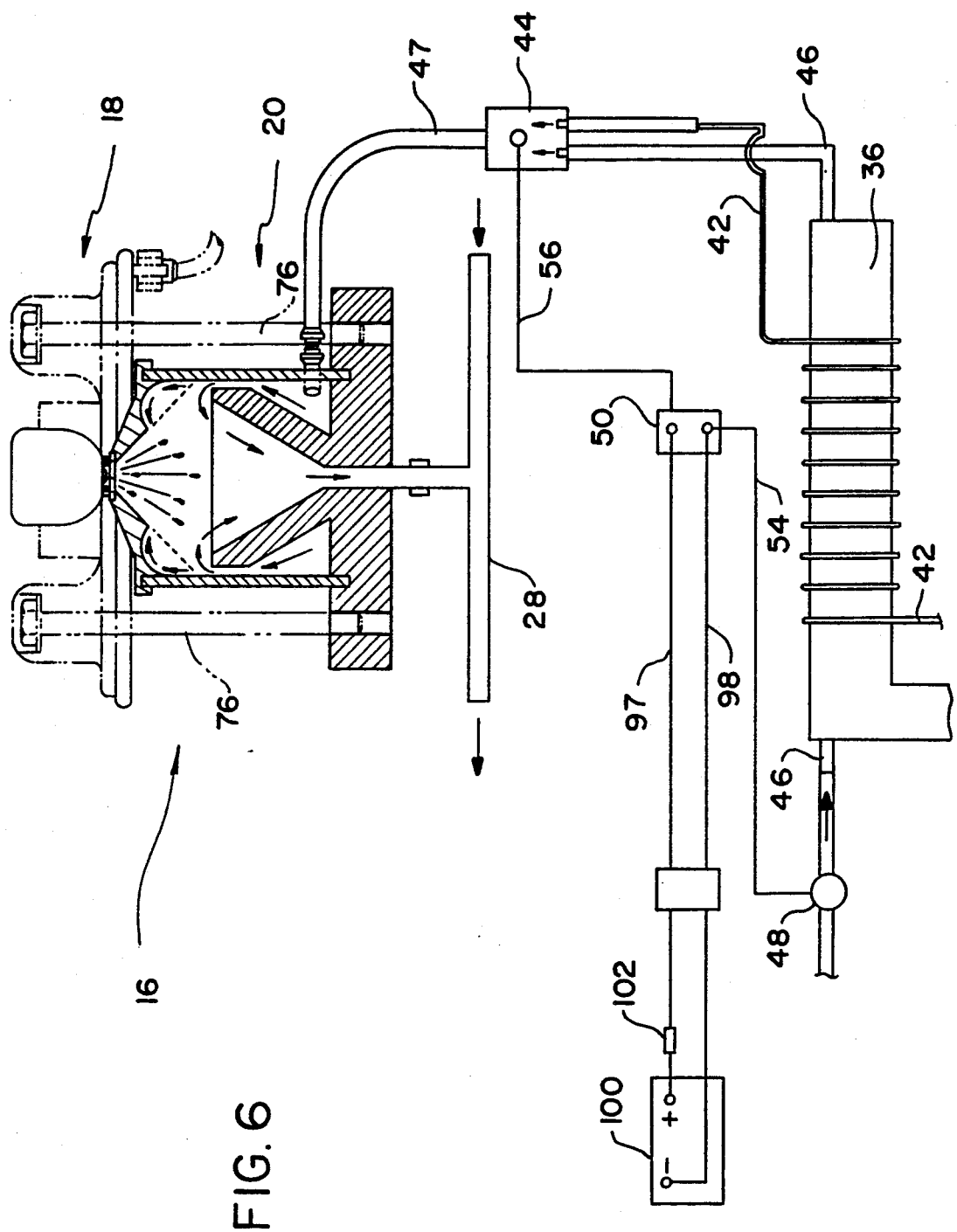
FIG. 6 is diagrammatic view of the fuel vaporizing system according to the present invention.
Figure 7:
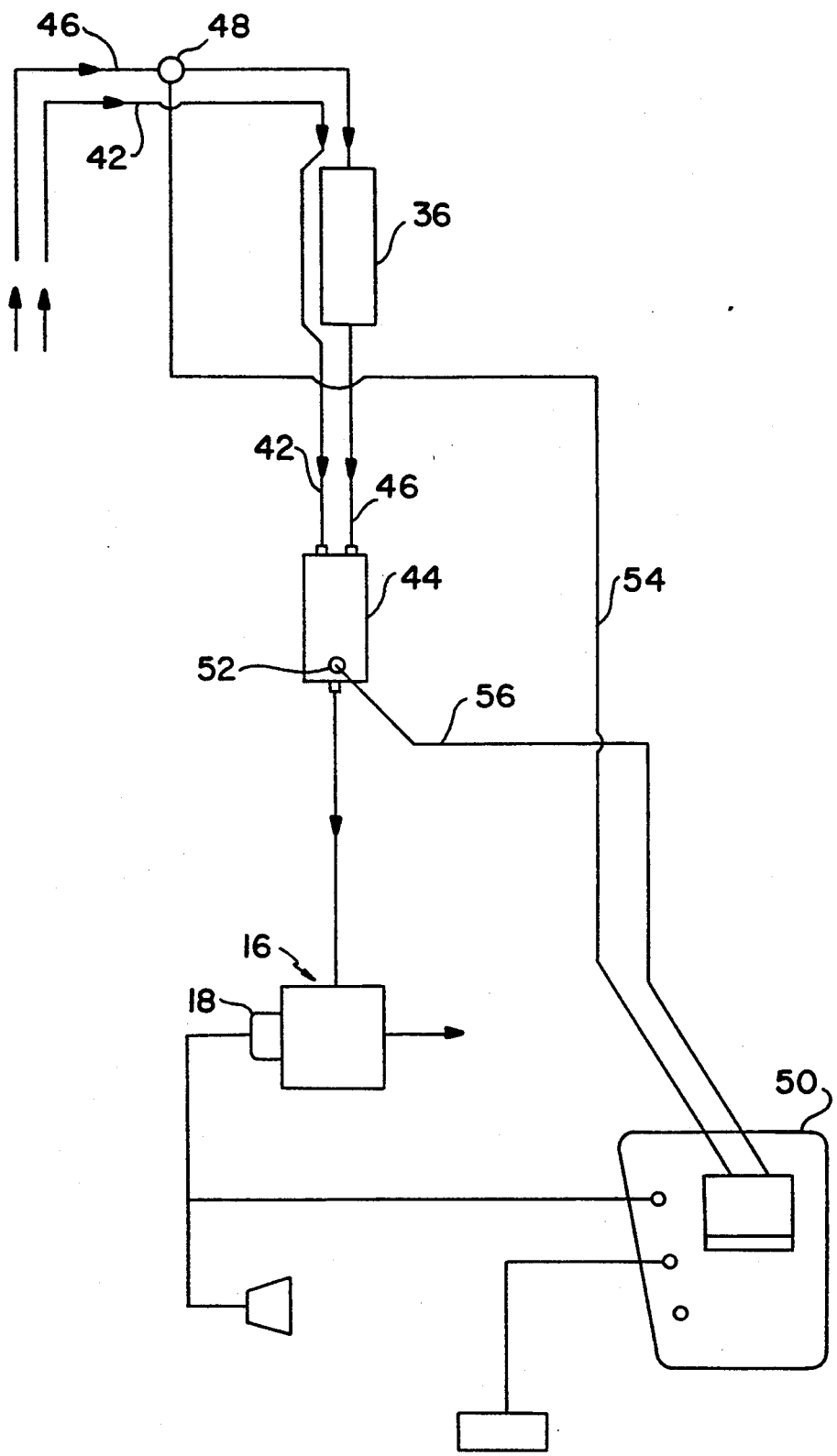
FIG. 7 is a diagram layout of the fuel vaporizing system according to the present invention.

The details of the fuel injection system are shown in FIG. 6. The fuel injection system includes a fuel vaporizing device the same as or similar to the device 16 described and shown above in combination with other system components to be described below.

The temperature control unit 50 is connected by signal wires 97 and 98 to a source of DC current such as battery 100. A fuse 102 is provided in the circuit. The temperature control unit 50 is connected to solenoid flow control valve 48 by signal wire 54, and by signal wire 56 to the heat absorption unit 44.

Air can be supplied through an air filter (not shown) into high heat tube 46, which passes through the exhaust manifold 36. Also, air is introduced into low heat tube 42 from the same or a different inlet source such as the air filter. The low heat tube 42 is shown coiled around the heat manifold 36, but can in addition or alternatively be coiled about the exhaust pipe (see the embodiment shown in FIG. 1).

The heat absorption unit 44 is connected to the fuel vaporizing device 16 by a vaporizing tube 47. Extending from the fuel vaporizing device 16 is a passage 28 extending through the E.G.R. valve leading to the E.G.R. port in the intake manifold (See FIG. 1). A schematic diagram of the fuel injection system is shown is FIG. 5.

DETAILS OF OPERATION

Referring to FIGS. 1 and 2, air enters the fuel injection system through air filter 40. From the air filter 40, a stream of air enters the high heat tube 46 and is heated as it passes through the section of tube that passes through the exhaust manifold 36. The solenoid flow control valve 48 controls the volume of air passing through the high heat tube 46. Also, a stream of air from filter 40 enters the low heat tube 42 and is heated as it passes through the section of tube coiled about the exhaust pipe 38.

The air streams through both the high heat tube 46 and low heat tube 42 enter the heat absorption unit 44 provided with a thermocouple 52. The thermocouple 52 generates a signal based on the temperature of the combined air streams from the high heat tube 46 and the low heat tube 42 after mixing within the heat absorption unit. This signal is passed along signal wire 56 to the temperature control unit 50, which based upon this input signal from the thermocouple 52 generates a control output signal. The output signal can be selected or adjusted accordingly by the temperature control unit 50. The output signal from the temperature control unit 50 is passed along signal wire 54 to the solenoid flow control valve 48, which controls the flow through the high heat tube 46. Thus, these components provide a feed back loop for maintaining the temperature of the mixed air stream of air exiting from the heat absorption unit within a pre-selected range.

More specifically, the temperature of the air stream exiting from the heat absorption unit 44 is controlled by controlling the amount of hot air entering into the air stream mixture forming within the heat absorption unit 44. This is achieved by controlling the amount of flow passing through the high heat tube 46 by means of solenoid flow control valve 48. Thus, the mixed stream of air exiting the heat absorption unit 44 must have a temperature no lower than the air stream entering the heat absorption unit through low heat tube 42, and no higher than the temperature of the stream of air entering the heat absorption unit through the high heat tube 46.

The temperature controlled air stream exiting the heat absorption unit 44 is directed to the fuel vaporizing device 16 by vaporizing tube 47. Referring to FIG. 3, the vaporizing tube (not shown) is connected to the tube connector 73, which passes through the annular body 66 to the air injector 74 of the fuel vaporizing component 20.

Fuel, for example from a fuel tank, of the vehicle or equipment is heated as it passes through the section of fuel line 33 coiled around the fuel heating assembly 34. The heated fuel is then supplied to the fuel injector 78 by means of fuel line 33 and connector 80 attached to the housing 77 of the fuel injecting component 18. Within the interior of the fuel vaporizing component 20, the air stream entering through the air injector 74 is directed in a circumferential path along the inner wall of the annular body 66 into the annular flow path 68. The air achieves a vortex flow within the annular flow path 68 and then flows into the mixing region 75. In the mixing region 75, the air is combined with a directed fuel spray from the fuel injector 78 prior to exiting the device through the nozzle section 60 and the flow path 64.

Comparing flow pressures within the fuel vaporizing component 20, the annular flow path 68 is at a higher pressure relative to the lower pressure existing in the mixing region 75. Thus, the heated high pressure air moves from the annular flow path 68 along the inner wall surface of the annular body 66 as a vortex, and is subsequently reflected by the annular concave surface section 72 of the annular end cap 70 into the low pressure mixing region 75. Heated fuel from the fuel injector 78 mixes with the heated vortex stream and expands as it enters the low pressure mixing region 75. The combination of the fuel being heated, expanded, and mixed with the vortex of heated air facilitates a high degree of vaporization of the fuel into the air stream.

The air/fuel mixture being formed within the fuel vaporizing and injecting device 16 is also exposed to turbulent fluid flow and mixing within the fuel vaporizing component 20 due to the directing of the flow of fuel along the inner surface of the annular body 66 in a circumferential direction by the air injector 74. The interior shape of the chamber defined by the fuel vaporizing component 20 and the fuel injecting component 18 influence the extent of mixing of the air/fuel mixture. The annular concave surface section 72 of the annular end cap 70 reflects the vortex flow formed along the inner wall surface of the annular body 66 down into the nozzle section 60 which further tends to increase fuel-/air mixing due to the change in average flow direction.

After the air/fuel mixture is developed within the fuel vaporizing device 16, this mixture exits through the nozzle section 60 and out the flow passage 64 in the base plate 58. This flow is then directed through the passage 28 in the E.G.R. valve 24 leading to the E.G.R. exit port 31.

The fuel/air vapor exits into the intake manifold 12 through the E.G.R. exit port 31. This mixture is mixed with the fuel/air mixture developed through the throttle body 82.

During a start up mode of the engine, the primary fuel injector 86 and auxiliary fuel injector may be operated while the fuel injector 78 of the vaporizer is shut off. After the engine reaches operating temperature, the primary fuel injector 86 is shut off and the fuel injector 78 is operated. Alternatively, all injectors are operated at various levels throughout varying conditions of operation of the engine in some pre-programmed manner.

EXAMPLE

The fuel injection system can be defined by three (3) separate subsystems. First, the fuel distribution system, second, the vaporizer, and third, the fuel vapor distribution to the engine. This system will be described below as employed on a 1989 Chevrolet Cavalier.

The fuel distribution starts with the stock fuel system including the fuel tank, fuel pump, fuel lines and the upper portion of the throttle body unit. The throttle body components consist of a cast aluminum body with fuel passages and mounting areas for the fuel pressure regulator and the fuel injector unit. The throttle body components mount directly to the vaporizer and are controlled by a computer.

The vaporizer is the key of the entire system. It uses three (3) different physical processes to convert liquid gasoline into an approximately 100 % vaporized fuel. The first process is to subject the fuel to heat in two stages. The first stage is to pre-heat the fuel with the engine coolant system as it is being pumped to the injector.

The second stage is to place the fuel under pressure to raise the boiling point of the fuel so that heated fuel does not begin to vaporize until it is injected into the vaporizer. When the fuel is injected into the vaporizer, the pressure is reduced from 12 lbs. per square inch to 10–20 inches of vacuum. Thus, the boiling point is greatly reduced. As the liquid fuel enters the vaporizer, it begins to expand and is transformed from a high temperature, high pressure liquid to a higher temperature, low pressure vapor.

Inside the vaporizer the vapor is subject to second stage heating from the pre-heated air entering through the air injector located under the nozzle section of the base plate. The vaporizer tube leading to the vaporizer begins at the air filter as two separate tubes. One tube is the low heat tube and extends from the air filter and is coiled around the outside of the exhaust manifold and connects to the heat absorption unit. The low heat tube will supply an air stream at approximately 320° F. continually to the heat absorption unit.

The other tube is the high heat tube and draws clean air from the air filter through a solenoid flow control valve that at rest is closed. Past the solenoid flow control valve, the high heat tube passes through the inside of the exhaust manifold and is connected to the heat absorption unit.

The temperature of the air stream is sensed by a thermocouple mounted near the éxit of the heat absorption unit. The thermocouple is connected to a heat control device (Chromalox unit), which opens the solenoid flow control valve in the high heat tube to allow air flow of approximately 1100°–1400° F. into the heat absorption unit. When the temperature reaches the set temperature programmed into the Chromalox unit, the solenoid is closed and the air flow from the high heat side stops. The mixture of the high heat air stream and low heat stream then flows through the vaporizer tube to the vaporizer. The vaporizer tube connects to the tube connector which leads to the air injector within the vaporizer.

The third process for transforming the fuel into vapor is by producing vortex flow within the vaporizer. The vortex is generated from the air stream that enters the vaporizer at high temperature under atmospheric pressure, flowing in a circular pattern around and between the nozzle section and the inner surface of the annular body. The heated air vortex contacts the fuel vapor in the region defined between the nozzle sections. The nozzle section of the fuel injecting component is a reduced sized mirror image of the nozzle of the vaporizing component.

The vortex generates a high pressure area next to the air injector and flows along the outer surface of the nozzle of the vaporizer component. This suspends the vapor in the vaporizer and eliminates contact between the vapor and the metal components of the vaporizer.

The final subsystem, the vapor distribution to the engine, functions the same way as that of a carburetor or throttle body injector. The vapor is sucked into the intake manifold by a vacuum caused by the operation of the engine.

While the invention has been shown and described in detail, it is obvious that this invention is not to be considered as being limited to the exact form disclosed, and that changes in detail and construction may be made therein within the scope of the invention, without departing from the spirit thereof.

I claim:

1. A fuel vaporier for use in conjunction with a fuel injector on an internal combustion engine, comprising:
   a base plate having a fluid passage extending therethrough;
   a cone shaped nozzle section extending from one side of said base plate in alignment with and converging toward the fluid passage;
   an annular body connected at one end to the base plate and extending from the same side of the base plate as said nozzle section, and surrounding said nozzle section in concentric, spaced relationship thereto, defining an annular space therebetween;

an end cap connected to an opposite end of said annular body, said end cap having a divergent opening extending therethrough, defining another nozzle section facing said nozzle section on said base plate and defining a mixing region therebetween; and an air injector passing through a wall portion of the annular body and extending into the annular space defined between said nozzle section of said base plate and an inner wall surface of said annular body to cause air to enter said annular space with a swirling motion and to pass upwardly through said space and around said convergent nozzle section into the mixing region, whereby fuel sprayed from a fuel injector and through said divergent nozzle enters said mixing region and encounters said swirling air, atmozing said fuel and preventing it from contacting the wall of said annular body or said convergent nozzle section.

2. A fuel vaporizing according to claim 1, wherein a fluid passage through said nozzle section of said base plate is aligned with a fluid passage through said nozzle section of said end cap.

3. A fuel vaporizer according to claim 2, wherein said nozzle section of said end end cap is a reduced mirror image of said nozzle section of said base plate.

4. A fuel vaporizer according to claim 2, wherein said nozzle section of said annular cap extends to an end concave surface area section on the inner surface of said end cap.

5. A fuel vaporizer according to claim 1, wherein said nozzle section of said annular cap is a reduced sized mirror image of said nozzle section of said base plate.

6. A fuel vaporizer according to claim 1, wherein said nozzle section of said annular cap extends to an end concave surface section area on the inner surface of said end cap.

7. A fuel vaporizer according to claim 1, including a fuel injector housing for accommodating said fuel injector and positioned adjacent to said end cap, said housing being provided with a fuel line connector leading to said fuel injector.

8. A fuel vaporizer according to claim 7, wherein said fuel injector housing is connected to said base plate with the annular body positioned therebetween.

9. A fuel vaporizer according to claim 8, wherein said fuel injection housing is connected to said base plate with at least one bolt.

10. A fuel vaporizer according to claim 1, wherein said air injector is configured to direct an air stream around the inner circumference of the annular body to produce a vortex flow to increase mixing of the forming fuel/air mixture.

11. A fuel vaporizer according to claim 1, wherein an annular space is provided between said nozzle section of said base plate and an inner surface of said annular body to provide an annular flow passage extending to a mixing region defined between said nozzle sections.

12. A fuel vaporizer according to claim 1, including an emission gas recirculation valve connected to said base plate having a passage aligned with said flow passage through said base plate.

13. A fuel vaporizer according to claim 12, including an adapter connected between said emission gas recirculation valve and said base plate, said adapter having a flow passage aligned with the flow passages through said emission gas recirculation valve and said base plate.

14. A fuel vaporizer according to claim 1, including a throttle body fluidly connected to said fuel vaporizer.

15. A fuel vaporizer according to claim 14, wherein said throttle body includes a primary fuel injector and a secondary fuel injector.

16. A fuel vaporizer system for an induction fuel injected internal combustion engine, comprising:
a supply of fuel;
a throttle body fluidly connected with an intake manifold of the engine; and a fuel vaporizing device, comprising
a base plate having a fluid passage extending therethrough;
a nozzle section extending from one side of said base plate and aligned with the fluid passage;
an annular body extending from the same side of the base plate as said first nozzle section, and surrounding said nozzle section;
an annular end cap connected to an opposite end of said annular body, said annular cap having an opening extending to another nozzle section facing said nozzle section of said annular plate and defining a mixing region;
an air injector passing through a wall portion of the annular body and extending into a space defined between said nozzle section of said base plate and an inner surface wall of said annular body; and
a fuel injector positioned adjacent to said annular cap in a manner to allow a directed stream of fuel from the fuel injector to pass through said opening in said annular end cap through said nozzle section of said annular cap for mixing with a flow of air located within the mixing region before exiting through said nozzle section and the fluid passage of said base plate,
said throttle body accomadating said fuel vaporizing device connected to said fuel supply.

17. A fuel vaporizer system for a multiport fuel injected internal combustion engine, comprising:
a supply of fuel; and
a plurality of fuel vaporizing devices, each device including:
a base plate having a fluid passage extending therethrough;
a nozzle section extending from one side of said base plate and aligned with the fluid passage;
an annular body extending from the same side of the base plate as said first nozzle section, and surrounding said nozzle section;
an annular end cap connected to an opposite end of said annular body, said annular cap having an opening extending to another nozzle section facing said nozzle section of said annular plate and defining a mixing region;
an air injector passing through a wall portion of the annular body and extending into a space defined between said nozzle section of said base plate and an inner surface wall of said annular body; and
a fuel injector positioned adjacent to said annular cap in a manner to allow a directed stream of fuel from the fuel injector to pass through said opening in said annular end cap through said nozzle section of said annular cap for mixing with a flow of air located within the mixing region before exiting through said nozzle section and the fluid passage of said base plate,
said plurality of fuel vaporizing devices being connected to said fuel supply.

18. A fuel vaporizing system for an internal combustion engine, comprising:

a source of providing a stream of pre-heated air;

a source of pressurized pre-heated fuel;

a fuel vaporizer comprising a fuel injector and configured to provide a vortex flow of the pre-heated air within the vaporizer for mixing with the pressurized pre-heated fuel introduced by the fuel injector; and an emission gas recirculation valve connected to said fuel vaporizer and receiving a fuel/air mixture therefrom; and a conduit fluidly connecting said emission gas recirculation valve with an intake manifold of the internal combustion engine.

19. A fuel vaporizing system according to claim including:

an air filter having an inlet for air uptake;

a high heat tube extending from said air filter and extending through an exhaust manifold of the engine;

a low heat tube extending from said air filter and having a section coiled around an exhaust conduit of the engine;

a heat absorption unit having a thermocouple and fluidly connected to said high and low heat tubes;

a solenoid control valve associated with said high heat tube for controlling the flow of an air stream through said high heat tube;

a temperature control unit electrically connected to said thermocouple and said solenoid control valve for receiving an input signal from said solenoid and generating a control signal for said solenoid control valve defining a feedback system for controlling the temperature of a combined air stream formed from a mixture of air streams from said high and low heat tubes within said heat absorption unit;

a vaporizing tube extending from said heat absorption unit carrying the mixed air stream, said vaporizer tube being connected to said fuel vaporizer; and a fuel pre-heating assembly for pre-heating the fuel received by the fuel injector.

20. A fuel vaporizing system according to claim 18, wherein said fuel vaporizer is connected to an existing emission gas recirculation valve of the engine.

21. A fuel vaporizing system according to claim 20, wherein an adapter is connected between said fuel vaporizer and said emission gas recirculation valve.

22. A fuel injection system according to claim 18, wherein said fuel vaporizer is fluidly connected to an existing throttle body of the engine.

23. A fuel injection system according to claim 22, wherein a primary fuel injector of said throttle body is replace with said fuel vaporizer.

* * * * *